Dec. 6, 1955 J. BRILLIÉ 2,726,310
ELECTRIC ARC WELDING TORCH WITH A LIQUID-COOLED
NONCONSUMING ELECTRODE
Filed June 22, 1953
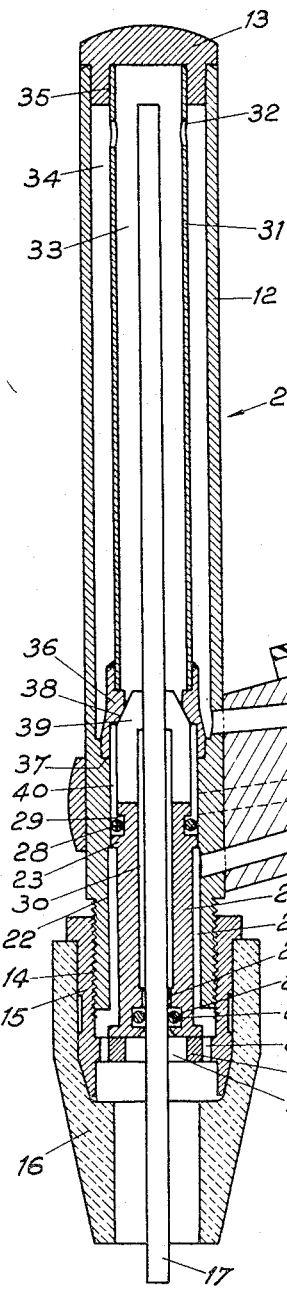
Fig. 1.
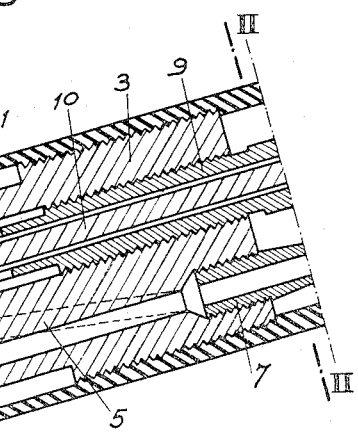
Fig. 2.
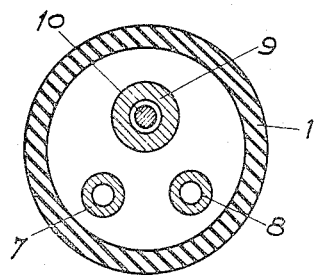
INVENTOR:
Jean Brillié,
BY *Stone, Boyden & Mack.*
ATTORNEYS

United States Patent Office 2,726,310
Patented Dec. 6, 1955

2,726,310

ELECTRIC ARC WELDING TORCH WITH A LIQUID-COOLED NONCONSUMING ELECTRODE

Jean Brillié, Paris, France, assignor to l'Air Liquide, Societe Anonyme pour l'Etude et l'Exploitation des Procedes Georges Claude, Paris, France Application June 22, 1953, Serial No. 363,263

Claims priority, application France June 23, 1952

2 Claims. (Cl. 219—15)

An object of the present invention is a torch for electric arc welding comprising a nonconsuming electrode cooled by direct contact with a liquid contained inside a cooling chamber surrounding the electrode and provided, for sealing said chamber from the outside, with an annular joint which surrounds the electrode near the end whence the arc starts.

The invention relates more particularly to a torch of this type, appropriated to the welding in a protecting gas atmosphere, for instance in an argon, helium or hydrogen atmosphere.

Most welding torches having liquid-cooled nonconsuming electrode comprise jackets for water circulation arranged as close as possible to the end of the electrode, by means of which the water cools a metal part which is a good heat conductor, placed in contact with the electrode. Due to the necessity for passing the cooling water and the protecting gas through the front part of the electrode holder, these devices require a complicated and costly machining.

It has been already proposed to cool the electrode by direct contact with water contained in a cooling chamber surrounding the electrode and to secure the clamping of the electrode, the supplying of the electric current thereto and the sealing of the cooling chamber by means of a ring made of a good conductor, soft metal, such as copper. Such a joint is devoid of elasticity and it is consequently impossible to obtain by this way a satisfactory sealing of the cooling chamber.

The welding torch which is an object of the invention is characterized in which the sealing joint is constituted by an elastic material, of rubber for instance, a clamp for attaching the electrode and supplying current thereto being preferably arranged in the cooling chamber.

The elastic material joint makes it possible to obtain a perfect sealing, while the clamping of the electrode and the supply of current thereto may be effected independently, in a known manner.

It has been found that contrary to all expectations, a joint thus effected remains tight for a very long period of operation, without being affected by the vicinity of the electric arc.

In a preferred type of embodiment of the invention, the inlet orifice for the cooling liquid in the cooling chamber is arranged in the vicinity of the sealing joint and the outlet orifice in the vicinity of the end of the electrode opposed to that whence the arc strikes. The cooling chamber comprises advantageously two concentric compartments communicating together at the end opposite the joint, the cooling liquid circulating from bottom to top in the inner compartment, and from top to bottom in the outer compartment.

Further, in the case of a welding torch in a protecting gas atmosphere, the annular joint surrounding the electrode is preferably housed in a groove provided in a sleeve which the casing of the cooling chamber surrounds so as to provide between it and the sleeve a space in which the protecting gas arrives and a second annular joint is arranged between the sleeve and the casing which surrounds it so as to separate the arrival of the cooling liquid and that of the protecting gas.

By way of example, one form of embodiment of the invention has been described hereinafter and is represented in the appended drawing.

Figure 1 is a horizontal section of a torch for arc welding in an argon atmosphere, comprising a tungsten electrode cooled by water in accordance with the invention.

Figure 2 is a section along II—II in Figure 1.

The torch comprises a hollow handle 1, made of insulating material, and a metal electrode holder 2. The hollow handle 1 is screwed on a metal body 3, of copper for instance, which is preferably oven enamelled at a high temperature, on the outside. The metal body 3 is mechanically and electrically integral with the electrode holder 2 and is bored by three channels, 4, 5 and 6, for the supplying of argon, and for the inlet and outlet of the cooling water. These three channels open, on the side of the handle, into threaded bores which receive pipes 7, 8 and 9 (Figure 2). Flexible hoses (not shown) for the argon supply and the inlet and outlet of the water are mounted on the end of each pipe 7, 8, 9. The pipe 9 has a larger diameter than that of the two others and a metal wire 10 leading the welding current to the electrode passes through the flexible hose used as an outlet for the cooling water and in the corresponding pipe 9 and is secured at the inner end of the pipe 9. In the vicinity of that end, holes 11 are provided for the passage of water.

The electrode holder 2 comprises a cylindrical casing 12, preferably oven enamelled on the outside, at a high temperature. This casing 12 is closed, at its upper portion, by a plug 13 and provided at its lower portion with an outer screw thread 14 on which is screwed a socket 15 covered by a duct 16 of refractory material for canalizing the argon around the lower end of the electrode 17. The socket 15 is provided with a front plate 18 provided with a central orifice 19 for the passage of the electrode 17 and peripheral orifices 20 for the passage of the argon. A sleeve 21 engaged in the lower bore 22 of the casing 12 rests on this plate 18. The outer diameter of the sleeve 21 is slightly less than that of the bore 22 and the centering of the sleeve 21 is ensured by a shoulder 23. There is thus provided between the bore 22 and the sleeve 21, an annular space 24 in which opens the argon supply channel 4.

Two annular, rubber joints are provided. One, 25, surrounds the electrode 17 in the vicinity of its lower end and is housed in a groove 26 provided inside the base of the sleeve 21, inside a bore 27 having a diameter very slightly larger than that of the electrode 17. The other one, 28, is housed in a groove 29 provided on the outside, above the shoulder 23.

Above the bore 27, the sleeve 21 leaves around the electrode 17, a space 30 filled with cooling water.

The upper portion of the cooling chamber is divided into two concentric compartments by a tubular wall 31, drilled, at its upper portion, with holes 32 which give a communication between the two compartments, the inner one 33 and the outer one 34.

The tubular wall 31 is engaged, at its top, in a bore 35 of the plug 13 and it is welded, at its base, on a ring 36 resting on an inner shoulder 37 of the casing 12.

The ring 36 offers a conical bearing 38 against which is pressed the corresponding conical portion of a clamp 39 consisting of the upper end of the sleeve 21, slit along two perpendicular diametral planes. The clamp 39 is forced in the conical bearing 38 by the axial displacement of the sleeve 21, obtained by means of the socket 15 engaged on the screw thread 14. It is sufficient, therefore, to rotate the socket 15 for tightening or loosening the clamp 39 and thus for adjusting the position of the electrode 17.

The channel 5 opens into a space 40 surrounding the clamp 39 and communicating with the base of the inner compartment 33 and with the space 30 through the slots in the clamp 39.

The cooling water therefore circulates upwards in the inner compartment 33, then, going through the holes 32, it circulates downwards in the outer compartment. The water is then evacuated through the channel 6 which opens at the base of the outer compartment 34.

Inside the space 30, the water simply bathes the electrode and circulates naturally under the action of convection currents without requiring any special devices for canalizing the water downwards. The cooling obtained is sufficient for preventing any damaging of the rubber joint 25 which thus ensures a perfect sealing for a very long period of use.

What I claim is:

1. In an electric arc welding torch, a head adapted to hold a nonconsuming electrode and comprising: a cooling chamber formed in part by and surrounding said electrode to carry liquid in direct contact with the electrode, said cooling chamber being provided with a sealing ring surrounding the electrode near an exposed end thereof and constituted by a resilient insulating material; and clamping means arranged inside said cooling chamber for securing the electrode and for supplying electric current thereto.

2. In a torch for electric arc welding in a protecting gas atmosphere, a head adapted to hold a nonconsuming electrode and comprising a cooling passage, formed in part by and surrounding the electrode to carry liquid in direct contact with the electrode, said head including a cylindrical casing, a sleeve surrounded by said casing and surrounding the electrode, so as to provide a passage for the protecting gas between said casing and said sleeve, said sleeve being provided with two resilient rings, arranged the first between said sleeve and the electrode and the other between said casing and said sleeve for sealing the cooling passage.

References Cited in the file of this patent

UNITED STATES PATENTS

| | | |
|---|---|---|
| 2,532,807 | Girard et al. | Dec. 5, 1950 |
| 2,554,236 | Bernard | May 22, 1951 |